UNITED STATES PATENT OFFICE.

JAMES BENOID, OF LONDON, ENGLAND.

LAUNDRY STARCH-POWDER.

No. 867,235.  Specification of Letters Patent.  Patented Oct. 1, 1907.

Application filed June 17, 1907. Serial No. 379,473.

*To all whom it may concern:*

Be it known that I, JAMES BENOID, a subject of the King of Great Britain and Ireland, residing at No. 220ᴬ Queen's road, Battersea, London, S. W., England, have invented certain new and useful Improvements in Laundry Starch-Powder, of which the following is a specification.

This invention has for its object to provide an improved starch, blue and the like powder for laundry purposes, giving great smoothness in ironing.

The improved powder is produced according to this invention by compounding certain substances in proportions suited to the water with which the laundry starch or blue is to be made. These substances are:— tungstate of soda; Epsom salts, carbonate of magnesia, borax, hyposulfite of soda, bicarbonate of soda, and French chalk. The limiting proportions in which these substances are to be used are substantially as follows:—

| | | |
|---|---|---|
| Tungstate of soda | from 1 to | 4 volumes. |
| Epsom salts | " 1 to | 4 " |
| Carbonate of magnesia | " 3 to | 10 " |
| Borax | " 5 to | 20 " |
| Hyposulfite of soda | " 5 to | 15 " |
| Bicarbonate of soda | " 2 to | 8 " |
| French chalk | " 1 to | 7 " |

The most suitable proportions for use with London water are as follows:—

| | |
|---|---|
| Tungstate of soda | 2 volumes. |
| Epsom salts | 2 " |
| Carbonate of magnesia | 5 " |
| Borax | 10 " |
| Hyposulfite of soda | 10 " |
| Bicarbonate of soda | 5 " |
| French chalk | 3 " |

The above mentioned substances are to be measured and used in the state of fine powder, and mixed intimately together in the dry state. Sufficient ultramarine blue or other coloring matter may be added to give the desired tint.

When used for making laundry starch the improved powder is to be mixed with water with from 35 to 65 times its volume of maize starch or rice starch and used in the ordinary manner. When intended for cold or raw starching, luke-warm water must be used for making the starch solution.

The improved powder, starch, blue or the like, produced according to this invention acts as a disinfectant and an antiseptic, and also renders textile articles treated therewith non-inflammable.

What I claim and desire to secure by Letters Patent of the United States is:—

1. An improved laundry starch powder composed of 2 volumes of tungstate of soda, 2 volumes of epsom salts, 5 volumes of carbonate of magnesia, 10 volumes of borax, 10 volumes of hyposulfite of soda, 5 volumes of bicarbonate of soda, and from 1 to 7 volumes of French chalk, mixed together.

2. An improved laundry starch powder having as a part thereof tungstate of soda, epsom salts, carbonate of magnesia, borax, hyposulfite of soda, and bicarbonate of soda.

3. An improved laundry starch powder consisting of tungstate of soda, epsom salts, carbonate of magnesia, borax, hyposulfite of soda, bicarbonate of soda, and French chalk.

In testimony whereof I have hereunto set my hand in presence of two subscribing witnesses.

JAMES BENOID.

Witnesses:
  PERCY PHILLIPPS,
  L. A. SUTTON.